United States Patent
Nakayama (10) Patent No.: US 9,032,936 B2
(45) Date of Patent: May 19, 2015

(54) CONTROL DEVICE FOR INTERNAL COMBUSTION ENGINE

(75) Inventor: Yusuke Nakayama, Gotemba (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 445 days.

(21) Appl. No.: 13/520,123

(22) PCT Filed: Mar. 19, 2010

(86) PCT No.: PCT/JP2010/054800
§ 371 (c)(1),
(2), (4) Date: Jun. 29, 2012

(87) PCT Pub. No.: WO2011/114508
PCT Pub. Date: Sep. 22, 2011

(65) Prior Publication Data
US 2012/0277981 A1   Nov. 1, 2012

(51) Int. Cl.
*F02M 21/02*   (2006.01)
*F02D 41/00*   (2006.01)
*F02D 19/06*   (2006.01)
*F02D 41/30*   (2006.01)
*F02D 41/14*   (2006.01)

(52) U.S. Cl.
CPC ........ *F02D 41/0027* (2013.01); *F02D 19/0647* (2013.01); *F02D 41/1454* (2013.01); *F02D 41/307* (2013.01); *Y02T 10/36* (2013.01); *F02D 19/0615* (2013.01); *F02D 19/0692* (2013.01); *F02D 19/0613* (2013.01)

(58) Field of Classification Search
CPC .......................... F02B 2043/103; F02M 13/08
USPC .................................. 123/1 A, 525, 575–578
See application file for complete search history.

(56) References Cited

U.S. PATENT DOCUMENTS

| | | | |
|---|---|---|---|
| 8,695,575 B2 * | 4/2014 | Nakayama | 123/575 |
| 2009/0024301 A1 * | 1/2009 | Volpato | 701/103 |

FOREIGN PATENT DOCUMENTS

| | | |
|---|---|---|
| JP | 2001-193511 A | 7/2001 |
| JP | 2007-269227 A | 10/2007 |
| JP | 2008-014162 A | 1/2008 |
| JP | 2008-175159 A | 7/2008 |
| JP | 2008-202545 A | 9/2008 |

* cited by examiner

*Primary Examiner* — John Kwon
(74) *Attorney, Agent, or Firm* — Sughrue Mion, PLLC (57) ABSTRACT

A control device for an internal combustion engine includes an engine and a control unit. The engine can be driven by switching between CNG fuel and liquid fuel. The control unit switches an air fuel ratio, in case of switching fuel to be supplied to the engine between the CNG fuel and the liquid fuel, so that torque fluctuation of the engine is unchanged before and after switching the fuel.

4 Claims, 4 Drawing Sheets

CONTROL DEVICE FOR INTERNAL COMBUSTION ENGINE

CROSS REFERENCE TO RELATED APPLICATION

This application is a National Stage of International Application No. PCT/JP2010/054800 filed Mar. 19, 2010, the contents of all of which are incorporated herein by reference in their entirety.

TECHNICAL FIELD

The present invention relates to control of a vehicle including an internal combustion engine (an engine).

BACKGROUND TECHNIQUE

Conventionally, there is known a bifuel vehicle which switches between the use of gas fuel such as CNG (Compressed Natural Gas) and the use of liquid fuel in order to realize the low emission. For example, in Patent Reference-1, there is disclosed a technique which keeps the target torque set just before switching the fuel, at the time of switching the fuel from the gas fuel to gasoline, so that the passengers does not feel the big torque shock even when the fuel to be used is switched from the gas fuel to the gasoline. In Patent Reference-1, there is also disclosed a technique which gradually returns the setting element of the target torque to the torque characteristic by the gasoline as time passes.

Patent Reference-1: Japanese Patent Application Laid-open under No. 2008-014162

DISCLOSURE OF INVENTION

Problem to be Solved by the Invention

In the low-torque area such as an idling state, there is a possibility that the drivability deteriorates due to the deterioration of the torque fluctuation of the engine, even if the target torque before the switching is maintained. In this case, there is also a possibility that the emission deteriorates due to the deterioration of the drivability.

The present invention has been achieved in order to solve the above problem. It is an object of this invention to provide a control device for an internal combustion engine capable of suppressing the deterioration of the drivability and the deterioration of the emission due to switching the fuel to be used.

Means for Solving the Problem

According to one aspect of the present invention, there is provided a control device for an internal combustion engine, including: an engine which can be driven by switching between CNG fuel and liquid fuel; and a control unit which switches an air fuel ratio, in case of switching fuel to be supplied to the engine between the CNG fuel and the liquid fuel, so that torque fluctuation of the engine is unchanged before and after switching the fuel.

The above control device for an internal combustion engine includes an engine and a control unit. The engine can be driven by switching between CNG fuel and liquid fuel. The control unit is an ECU (Electronic Control Unit) for example, and it switches an air fuel ratio, in case of switching fuel to be supplied to the engine between the CNG fuel and the liquid fuel, so that torque fluctuation of the engine is unchanged before and after switching the fuel. In other words, the control device for an internal combustion engine sets the air fuel ratio just after switching the fuel so that the torque fluctuation of the engine just before switching the fuel is equivalent to the torque fluctuation of the engine just after switching the fuel. The term "torque fluctuation" herein indicates the periodic variation of the engine torque. Thereby, the control device for an internal combustion engine can suppress the deterioration of the drivability and the deterioration of the emission due to the torque fluctuation.

In a manner of the control device for an internal combustion engine, in case of switching the fuel from the CNG fuel to the liquid fuel, the control unit switches the air fuel ratio to an air fuel ratio existing on a rich side selected from air fuel ratios with which the torque fluctuation is unchanged, and makes the air fuel ratio gradually approximate a target air fuel ratio after switching the air fuel ratio. The term "target air fuel ratio" herein indicates a target value of the air fuel ratio which is set after switching the fuel by the control device for an internal combustion engine. Concretely, it is a target value of the air fuel ratio determined on the basis of the fuel used after switching the fuel and the load of the engine. Generally, the torque fluctuation differs depending on the air fuel ratio. When the liquid fuel is used, the variation of the torque fluctuation associated with the variation of the air fuel ratio existing on the rich side is smaller than that associated with the variation of the air fuel ratio existing on the lean side. In consideration of the above-mentioned fact, in this manner, by switching the air fuel ratio to an air fuel ratio existing on the rich side selected from air fuel ratios with which the torque fluctuation is unchanged, the control device for an internal combustion engine can suppress the deterioration of the torque fluctuation even when the real value of the air fuel ratio deviates from the command value of the air fuel ratio. By making the air fuel ratio gradually approximate a target air fuel ratio after switching the air fuel ratio, the control device for an internal combustion engine can drive the vehicle after switching the fuel without deterioration of the drivability.

In another manner of the control device for an internal combustion engine, in case of switching the fuel from the liquid fuel to the CNG fuel, the control unit switches the air fuel ratio to an air fuel ratio existing on a lean side selected from air fuel ratios with which the torque fluctuation is unchanged, and makes the air fuel ratio gradually approximate a target air fuel ratio after switching the air fuel ratio. Generally, when the CNG fuel is used, the variation of the torque fluctuation associated with the variation of the air fuel ratio existing on the lean side is smaller than that associated with the variation of the air fuel ratio existing on the rich side. In consideration of the above-mentioned fact, in this manner, by switching the air fuel ratio to the air fuel ratio on the lean side selected from air fuel ratios with which the torque fluctuation is unchanged, the control device for an internal combustion engine can suppress the deterioration of the torque fluctuation even when the real value of the air fuel ratio deviates from the command value of the air fuel ratio. By making the air fuel ratio gradually approximate a target air fuel ratio after switching the air fuel ratio, the control device for an internal combustion engine can drive the vehicle after switching the fuel without deterioration of the drivability.

In still another manner of the control device for an internal combustion engine, the control unit switches the air fuel ratio so that the torque fluctuation of the engine is unchanged before and after switching the fuel, in a case where an influence caused by switching the air fuel ratio so that the torque fluctuation is unchanged is considered to be smaller than an influence caused by switching the air fuel ratio so that torque of the engine is unchanged before and after switching the fuel.

In this manner, the control device for an internal combustion engine determines which one of the influence caused by the control (hereinafter referred to as "torque fluctuation keeping control") of the air fuel ratio with which the torque fluctuation is unchanged before and after switching the fuel or the influence caused by the control (hereinafter referred to as "torque keeping control") of making the engine torque unchanged before and after switching the fuel is smaller. Concretely, the term "influence" herein indicates the degree of the deterioration of the drivability such as the noise which the driver feels, a sense of discomfort due to the vibration. Then, the control device for an internal combustion engine executes the torque fluctuation keeping control when the influence due to the variation of the engine torque caused by the torque fluctuation keeping control is considered to be smaller than an influence due to the deterioration of the torque fluctuation caused by the torque keeping control. At that moment, the control device for an internal combustion engine makes the above-mentioned determination based on the present operation state of the vehicle with reference to a predetermined map, for example. Thereby, the control device for an internal combustion engine can execute the torque fluctuation keeping control only in the case of the idling state and other cases where the torque fluctuation severely deteriorates due to the influence caused by the torque keeping control, and it can precisely suppress the deterioration of the drivability.

DETAILED DESCRIPTION OF THE PREFERRED EMBODIMENTS

A preferred embodiment of the present invention will be explained hereinafter with reference to the drawings.

[Schematic Configuration of Internal Combustion Engine]

Figure 1:
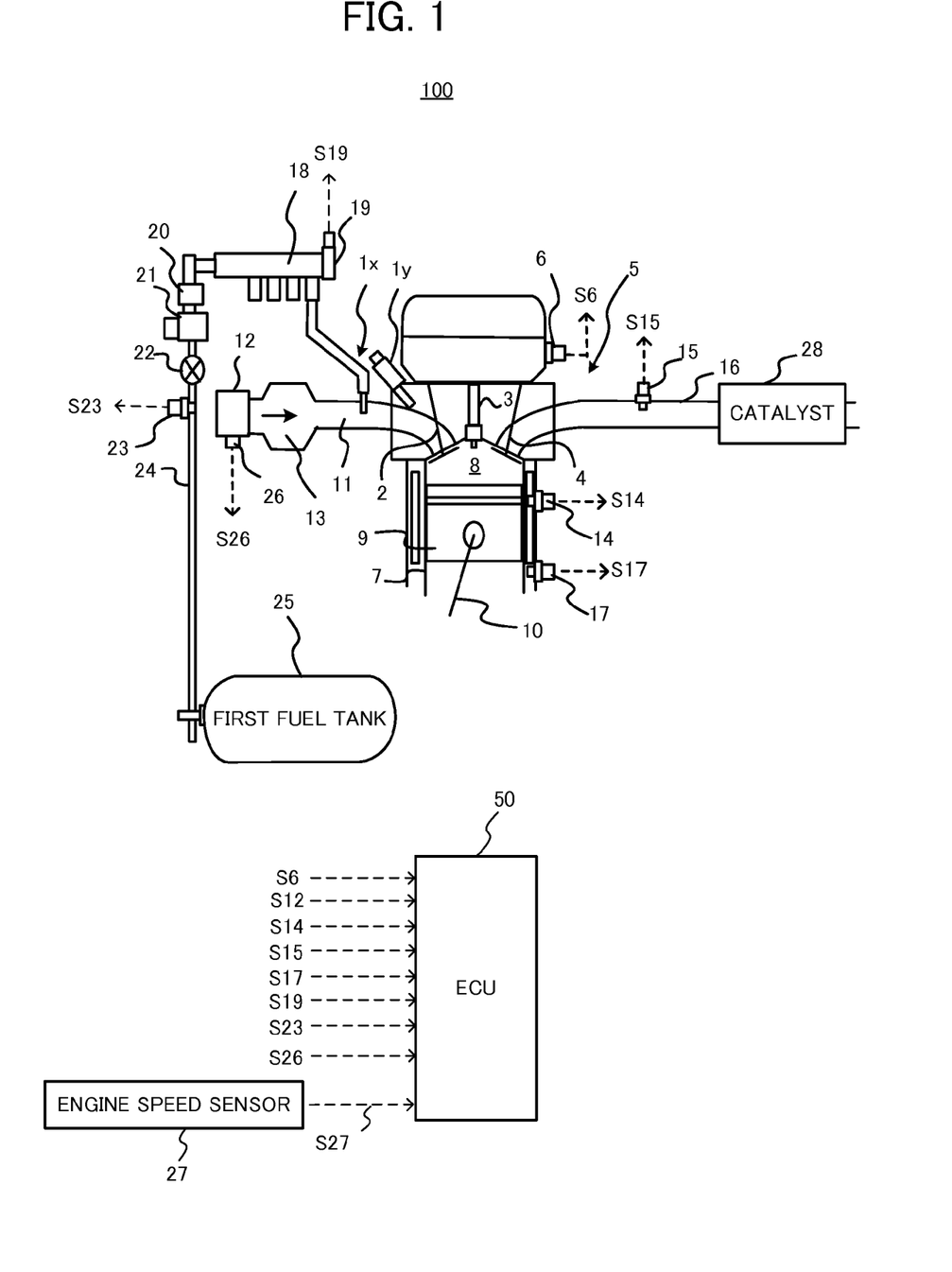
FIG. 1 is an example of a configuration of an internal combustion engine.

FIG. 1 shows a schematic configuration diagram of an internal combustion engine (engine) 100 to which the control device for an internal combustion engine according to the present invention is applied. The solid arrows show examples of flows of gas in the figure.

The internal combustion engine 100 mainly includes a first fuel injection valve 1x, a second fuel injection valve 1y, an intake valve 2, a sparking plug 3, an exhaust valve 4, a cylinder head 5, a cam angle sensor 6, a cylinder 7, a combustion chamber 8, a piston 9, a connecting rod 10, an intake passage 11, an electronic throttle valve 12, a surge tank 13, a water temperature sensor 14, an A/F sensor 15, an exhaust passage 16, a knocking sensor 17, a fuel delivery pipe 18, a gas temperature sensor 19, an oil separator 20, a regulator 21, an isolation valve 22, a gas pressure sensor 23, a fuel passage 24, a first fuel tank 25, a throttle position sensor 26, an engine speed sensor 27, a catalyst 28, and an ECU 50. It is noted that the internal combustion engine 100 practically includes plural cylinders 7 though only one cylinder 7 is shown in FIG. 1 for convenience of explanation.

The intake air (air), which is drawn in from the external, passes through the intake passage 11, and the electronic throttle valve 12 adjusts the flow amount of the intake air which passes through the intake passage 11. The opening degree (hereinafter referred to as "throttle opening degree") of the electronic throttle valve 12 is controlled by the control signal supplied from the ECU 50. The surge tank 13, which is provided on the intake passage 11, stores the air (intake air) and distributes the intake air to each of the combustion chambers 8 of the cylinders via intake ports. The combustion chamber 8 is supplied with the fuel which is injected by the first injection valve (injector) 1x and the second injection valve 1y.

Under the control of the ECU 50, the first injection valve 1x injects CNG (Compressed Natural Gas) fuel which is the gas fuel stored in the first fuel tank 25. Under the control of the ECU 50, the second injection valve 1y injects the liquid fuel stored in the second fuel tank which is not shown. Here, the liquid fuel may be gasoline, light oil, alcohol such as methanol and ethanol, and mixed fuel of them, for example.

In addition, the intake valve 2 and the exhaust valve 4 are provided in the combustion chamber 8. The intake valve 2 controls the flow and cutoff between the intake passage 11 and the combustion chamber 8 by opening and closing. The exhaust valve 4 controls the flow and cutoff between the exhaust passage 16 and the combustion chamber 8 by opening and closing. The opening timings, the closing timings, and the lift amounts of the intake valve 2 and the exhaust valve 4 are controlled by the cam shafts which are not shown. The cam angle sensor 6 detects the angle (phase) of the cam shaft and provides the detection signal S6 to the ECU 50.

In the combustion chamber 8, the gaseous mixture of the intake air and the fuel, which are supplied in the intake stroke as described above, is combusted by the ignition of the sparking plug 3 after the compression stroke. In this case, the piston 9 is reciprocated by the combustion, then the force of the reciprocation is transmitted to the crank shaft (not shown) via the connecting rod 10, and then the crank shaft rotates. The exhaust gas generated by the combustion in the combustion chamber 8 is discharged to the exhaust passage 16 in the exhaust stroke.

On the exhaust passage 16, there are provided the A/F sensor 15 and the catalyst 28. The A/F sensor 15 generates an output voltage proportional to the air fuel ratio (hereinafter referred to as "air fuel ratio AF") of the combusted gaseous mixture. The output voltage of the A/F sensor 15 is supplied to the ECU 50 by the detection signal S15. In addition, the water temperature sensor 14 and the knocking sensor 17 are provided on the engine block. The water temperature sensor 14 detects the water temperature (engine water temperature) of the coolant in the water jacket. The water temperature sensor 14 supplies the detection signal S14 corresponding to the engine water temperature to the ECU 50. The knocking sensor 17 detects a knocking on the basis of a vibration of the cylinder block. The knocking sensor 17 supplies the detection signal S17 to the ECU 50.

Meanwhile, on the fuel passage 24 connected to the first fuel tank 25, there are provided the gas pressure sensor 23, the isolation valve 22, the regulator 21, and the oil separator 20. The gas pressure sensor 23 detects the gas pressure corresponding to the fuel pressure in the fuel passage 24 and supplies the detection signal S23 thereof to the ECU 50. The isolation valve 22 controls the flow and cutoff in the fuel passage 24 under the control of the ECU 50. The regulator 21 is a mechanism which keeps the fuel pressure constant. The oil separator 20 separates impurities from the fuel passing through the fuel passage 24 and supplies the fuel delivery pipe 18 with the fuel from which the impurities is removed. The fuel delivery pipe 18 distributes the fuel supplied from the fuel passage 24 to the first fuel injection valves 1x each of which corresponds to each of the cylinders 7. In addition, on the fuel delivery pipe 18, there is provided the gas pressure sensor 19 which detects the gas pressure (fuel pressure) in the fuel delivery pipe 18. The gas pressure sensor 19 supplies the ECU 50 with the detection signal S19 corresponding to the gas pressure.

The engine speed sensor 27 generates output pulses indicating the engine speed (hereinafter referred to as "engine speed Ne"). The engine speed sensor 27 supplies the output pulses to the ECU 50 by the detection signal S27.

The ECU 50 includes a CPU (Central Processing Unit), a ROM (Read Only Memory), and a RAM (Random Access Memory), and executes various control of each component in the internal combustion engine 100. For example, the ECU 50 executes the control over the first and the second fuel injection valves 1x, 1y on the basis of the detection signals supplied as described above. The ECU 50 also controls the air fuel ratio AF when the ECU 50 performs the fuel switch (hereinafter simply referred to as "fuel switch") from the liquid fuel to the CNG fuel or from the CNG fuel to the liquid fuel. The ECU 50 functions as a control unit in the present invention.

Hereinafter, the term "CNG operation" indicates the operation in which the fuel injection is executed by the first fuel injection valve 1x, i.e., the operation in which the CNG fuel is used as a power source, and the term "liquid fuel operation" indicates the operation in which the fuel injection is executed by the second fuel injection valve 1y, i.e., the operation in which the liquid fuel is used as a power source. The term "torque fluctuation Tc" indicates the periodic variation of the engine torque due to the intermittent explosion in each cylinder.

[Control Method]

Next, a description will be given of the control executed by the ECU 50. Summarily, in case of switching the fuel, the ECU 50 changes the air fuel ratio AF so that the torque fluctuation Tc generated after switching the fuel is equivalent to the torque fluctuation Tc generated before switching the fuel. Thereby, the ECU 50 suppresses the deterioration of the drivability due to the variation of the torque fluctuation Tc.

The concrete control method thereof will be described with respect to each case. Hereinafter, the term "target air fuel ratio AFtag" herein indicates a target value of the air fuel ratio AF which is set by the ECU 50 after switching the fuel. Concretely, it indicates a target value of the air fuel ratio AF determined on the basis of the load of the engine and the fuel used after switching the fuel.

(Switch from CNG Fuel to Liquid Fuel)

In case of switching the fuel from the CNG fuel to the liquid fuel, the ECU 50 switches the present air fuel ratio AF to the air fuel ratio AF on the rich side selected from air fuel ratios with which the torque fluctuation Tc generated after switching the fuel is equivalent to the torque fluctuation Tc generated before switching the fuel. After that, the ECU 50 gradually changes the air fuel ratio AF to the target air fuel ratio AFtag. Thereby, the ECU 50 suppresses the deterioration of the drivability due to the difference between the torque fluctuation Tc generated before switching the fuel and the torque fluctuation Tc generated after switching the fuel.

Figure 2:
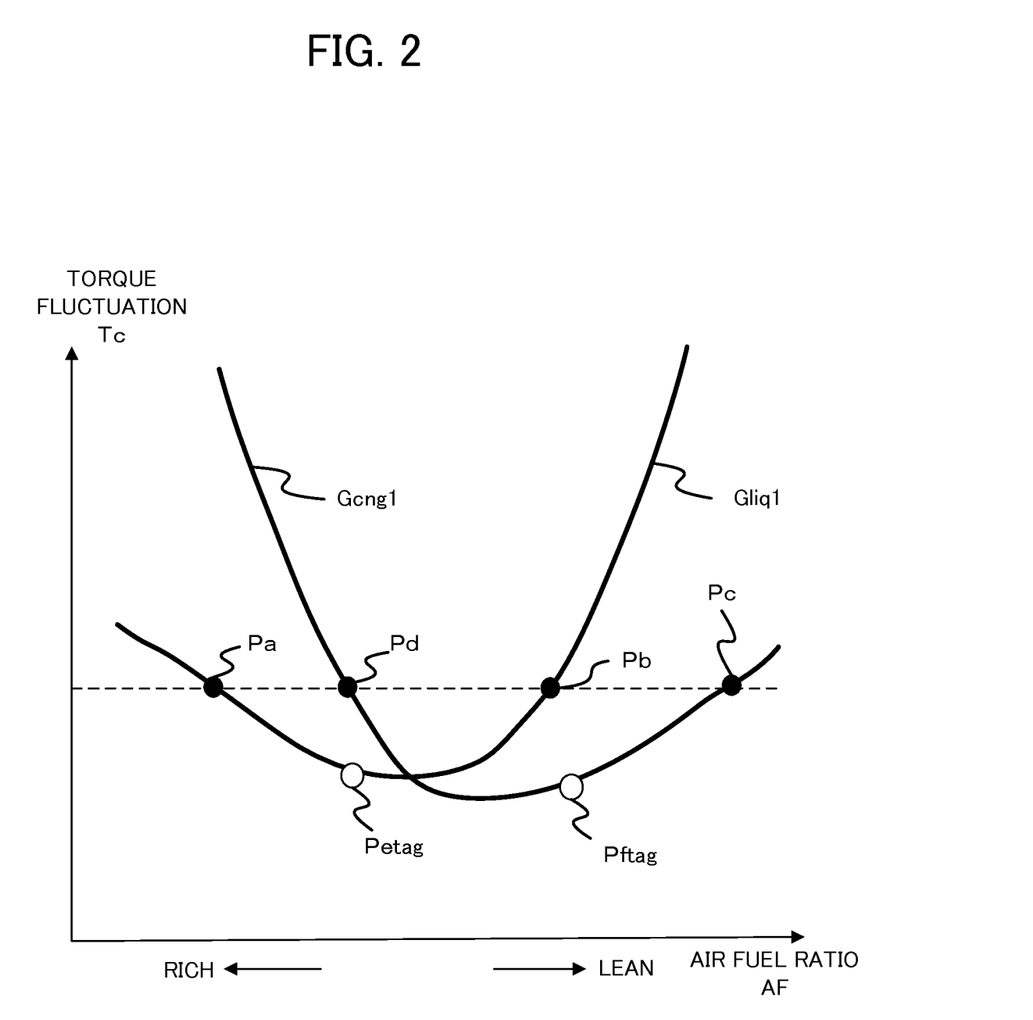
FIG. 2 is one example of a map showing the relationship between the torque fluctuation and the air fuel ratio with respect to each of the liquid fuel operation and the CNG operation in a case where the engine torque is constant.

The concrete description thereof will be given with reference to FIG. 2. FIG. 2 is one example of a map showing the relationship between the torque fluctuation Tc and the air fuel ratio AF with respect to each of the liquid fuel operation and the CNG operation in a case where the engine torque (hereinafter referred to as "engine torque Te") is equivalent. In FIG. 2, the graph "Gcng1" indicates the relationship between the torque fluctuation Tc and the air fuel ratio AF at the time of the CNG operation, and the graph "Gliq1" indicates the relationship between the torque fluctuation Tc and the air fuel ratio AF at the time of the liquid fuel operation.

Here, it is assumed that the air fuel ratio AF just before switching from the CNG operation to the liquid fuel operation exists at the corresponding point "Pc", and that the target air fuel ratio AFtag after switching the fuel exists at the corresponding point "Petag".

First, the ECU 50 executes the CNG operation in the operation range such as the start of the internal combustion engine 100 by the time when the catalyst 28 is warmed up, and other operation range where the deterioration of the emission is anticipated at the liquid fuel operation. Thereby, the ECU 50 realizes the low emission. Here, it is assumed that the ECU 50 determines that it should switch the fuel at the time when the state of the internal combustion engine 100 exists at the corresponding point Pc.

At that time, the ECU 50 recognizes the corresponding points "Pa" and "Pb" existing on the graph Gliq1 where the torque fluctuation Tc is equivalent to the torque fluctuation Tc of the corresponding point Pc. Then, in case of just after the change to the liquid fuel operation, the ECU 50 sets the air fuel ratio AF corresponding to the corresponding point Pa, which exists on the richer side compared to the corresponding point Pb, to the command value of the air fuel ratio AF.

The supplementary explanation thereof will be described. As shown in FIG. 2, on the graph Gliq1 corresponding to the liquid fuel operation, the variation ratio of the torque fluctuation Tc to the air fuel ratio AF in a case where the air fuel ratio AF varies toward the rich side is smaller than the variation ratio in a case where the air fuel ratio AF varies toward the lean side. In other words, at the time of the liquid fuel operation, in a case where the air fuel ratio AF exists on the richer side, compared to a case where the air fuel ratio AF exists on the lean side, the stability of the torque fluctuation Tc is higher. Therefore, by setting the air fuel ratio AF corresponding to the corresponding point Pa, which exists on the richer side compared to the corresponding point Pb, to the command value, the ECU 50 can suppress deterioration of the torque fluctuation Tc to the minimum even when the real value of the air fuel ratio AF deviates from the command value. In addition, by setting the air fuel ratio AF so that the torque fluctuation Tc generated after switching the fuel is equivalent to the torque fluctuation Tc generated before switching the fuel, the ECU 50 can also suppress the drivability deterioration due to the difference of the torque fluctuation Tc before and after switching the fuel.

Then, after the ECU 50 sets the air fuel ratio AF to the corresponding point Pa just after switching the fuel, the ECU 50 gradually puts the air fuel ratio AF close to the target air fuel ratio AFtag corresponding to the corresponding point Petag. Thereby, the ECU 50 smoothly executes the liquid fuel operation after switching the fuel without deteriorating the drivability.

Next, a description will be given of a case where there exists the air fuel ratio AF just before switching from the CNG operation to the liquid fuel operation at the corresponding point "Pd". In this case, at the time just after the change to the liquid fuel operation, similarly to the above mentioned example in which the air fuel ratio AF exists at the corresponding point Pc, the ECU 50 sets the air fuel ratio AF corresponding to the corresponding point Pa, which exists on the richer side compared to the corresponding point Pb, to the command value. Thereby, the ECU 50 can suppress the deterioration of the torque fluctuation Tc to the minimum even when the real value of the air fuel ratio AF deviates from the command value. In addition, by setting the air fuel ratio AF so that the torque fluctuation Tc generated after switching the fuel is equivalent to the torque fluctuation Tc generated before switching the fuel, the ECU 50 can also suppress the drivability due to the difference of the torque fluctuation Tc before and after switching the fuel.

As described above, the ECU 50 stores a map equivalent to FIG. 2 in advance, for example. Then, with reference to the above-mentioned map, the ECU 50 changes the air fuel ratio AF so that the torque fluctuation Tc generated after switching the fuel is equivalent to the torque fluctuation Tc generated before switching the fuel when the ECU 50 switches the fuel from the CNG fuel to the liquid fuel. Thereby, the ECU 50 can suppress the deterioration of the drivability and the deterioration of the emission caused by the variation of the torque fluctuation Tc due to the fuel switch. At that time, the ECU 50 changes the present air fuel ratio AF to the air fuel ratio AF on the rich side in which the torque fluctuation Tc generated after switching the fuel is equivalent to the torque fluctuation Tc generated before switching the fuel. Thereby, the ECU 50 can suppress the deterioration of the torque fluctuation Tc.

(Switch from Liquid Fuel to CNG Fuel)

When the ECU 50 switches the operation from liquid fuel operation to the CNG operation, the ECU 50 switches the present air fuel ratio AF to the air fuel ratio AF on the lean side selected from air fuel ratios with which the torque fluctuation Tc generated after switching the fuel is equivalent to the torque fluctuation Tc generated before switching the fuel. After that, the ECU 50 gradually changes the air fuel ratio AF to the target air fuel ratio AFtag. Thereby, the ECU 50 suppresses the deterioration of the drivability and the deterioration of the emission due to the difference between the torque fluctuation Tc generated before switching the fuel and the torque fluctuation Tc generated after switching the fuel.

The concrete description thereof will be given with reference to FIG. 2 again. Here, it is assumed that the air fuel ratio AF just before switching from the liquid fuel operation to the CNG operation exists at the corresponding point Pa, and that the target air fuel ratio AFtag after switching the fuel exists at the corresponding point Pftag.

First, at the time of the liquid fuel operation in the operation range where the deterioration of the emission is anticipated, the ECU 50 determines that it should switch the operation to the CNG operation. In this case, the ECU 50 determines that the ECU 50 should switch the liquid fuel operation to the CNG operation when the air fuel ratio AF exists at the corresponding point Pa.

At that time, the ECU 50 recognizes the corresponding points Pc and Pd existing on the graph Gcng where the torque fluctuation Tc is equivalent to the torque fluctuation Tc of the corresponding point Pa. Then, just after the change to the CNG operation, the ECU 50 sets the air fuel ratio AF corresponding to the corresponding point Pc, which exists on the leaner side compared to the corresponding point Pd, to the command value of the air fuel ratio AF.

The supplementary explanation thereof will be described. As shown in FIG. 2, on the graph Gcng corresponding to the CNG operation, the variation ratio of the torque fluctuation Tc to the air fuel ratio AF in a case where the air fuel ratio AF varies toward the lean side is smaller than the variation ratio of the torque fluctuation Tc to the air fuel ratio AF in a case where the air fuel ratio AF varies toward the rich side. In other words, at the time of the CNG operation, in a case where the air fuel ratio AF exists on the leaner side, compared to a case where the air fuel ratio AF exists on the richer side, the stability of the torque fluctuation Tc is higher. Therefore, by setting the air fuel ratio AF of the corresponding point Pc, which exists on the leaner side compared to the corresponding point Pd, to the command value, the ECU 50 can suppress deterioration of the torque fluctuation Tc to the minimum even when the real value deviates from the command value. In addition, by setting the air fuel ratio AF so that the torque fluctuation Tc generated after switching the fuel is equivalent to the torque fluctuation Tc generated before switching the fuel, the ECU 50 can also suppress the drivability deterioration due to the difference of the torque fluctuation Tc before and after switching the fuel.

Then, after the ECU 50 sets the air fuel ratio AF to the air fuel ratio AF corresponding to the corresponding point Pc just after switching the fuel, the ECU 50 gradually puts the air fuel ratio AF close to the target air fuel ratio AFtag corresponding to the corresponding point Pftag. Thereby, the ECU 50 smoothly executes the CNG operation after switching the fuel without deteriorating the drivability.

Next, a description will be given of a case where the air fuel ratio AF just before switching the liquid fuel operation to the CNG operation exists at the corresponding point Pb. Even in this case, at the time just after the change to the CNG operation, similarly to the above mentioned example in which the air fuel ratio AF exists at the corresponding point Pa, the ECU 50 sets the air fuel ratio AF of the corresponding point Pc, which exists on the leaner side compared to the corresponding point Pd, to the command value.

As described above, the ECU 50 stores a map equivalent to FIG. 2 in advance, for example. Then, with reference to the above-mentioned map, the ECU 50 switches the air fuel ratio AF so that the torque fluctuation Tc generated after switching the fuel is equivalent to the torque fluctuation Tc generated before switching the fuel when the ECU 50 switches the fuel from liquid fuel to the CNG fuel. Thereby, the ECU 50 can suppress the deterioration of the drivability and the deterioration of the emission caused by the variation of the torque fluctuation Tc due to the fuel switch. At that time, the ECU 50 switches the present air fuel ratio AF to the air fuel ratio AF on the lean side in which the torque fluctuation To generated after switching the fuel is equivalent to the torque fluctuation To generated before switching the fuel. Thereby, the ECU 50 can suppress the deterioration of the torque fluctuation Tc.

(Execution Condition)

Next, a description will be given of a preferred example of the execution condition of the control (hereinafter referred to as "torque fluctuation keeping control") which keeps the torque fluctuation To unchanged before and after switching the fuel. Summarily, at the time of switching the fuel, the ECU 50 determines which one of the influence caused by executing the torque fluctuation keeping control or the influence caused by executing the control (hereinafter referred to as "torque keeping control") which keeps the engine torque Te unchanged before and after switching the fuel is smaller. Then, at the time of switching the fuel, the ECU 50 executes the control which has a smaller influence on the drivability out of the torque fluctuation keeping control and the torque keeping control.

Figure 3:
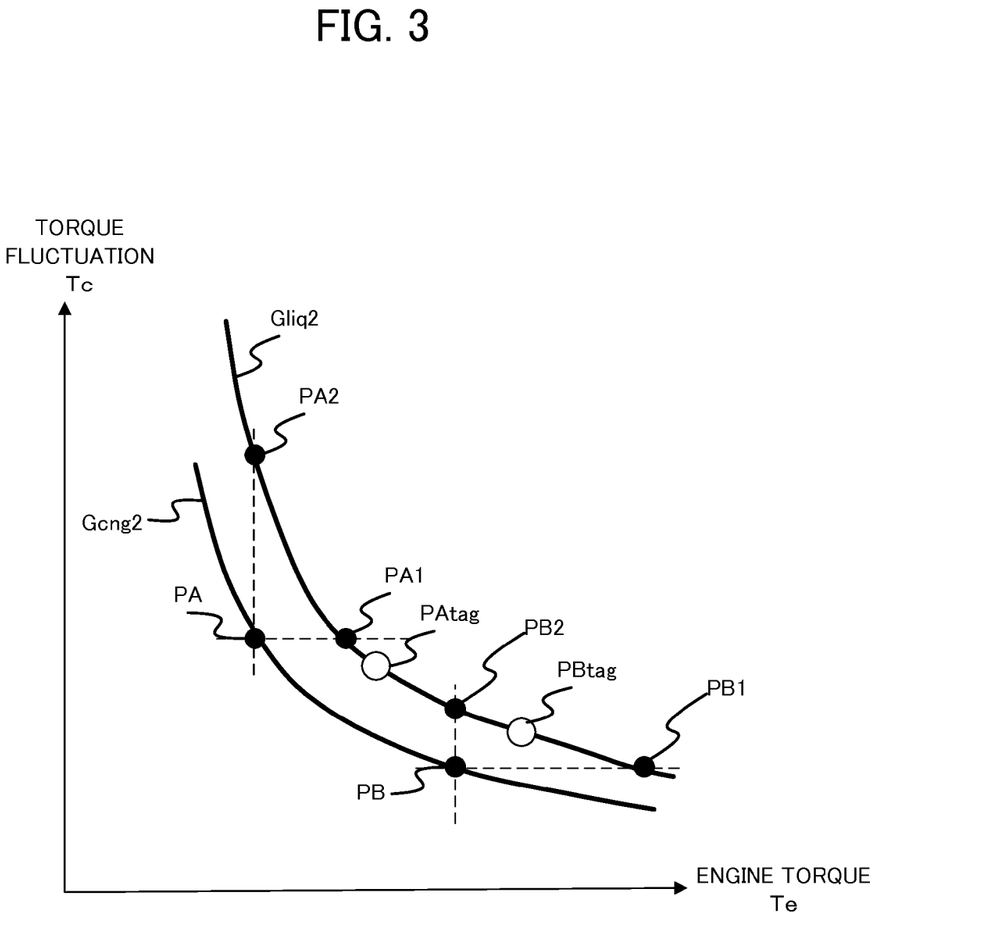
FIG. 3 is one example showing the relationship between the torque fluctuation and the engine torque at each time of the CNG operation and the liquid fuel operation.

The concrete description thereof will be given with reference to FIG. 3. FIG. 3 is one example showing the relationship between the torque fluctuation To and the engine torque Te at the time of the CNG operation and the liquid fuel operation. In FIG. 3, the graph "Gcng2" indicates the relationship between the torque fluctuation To and the engine torque Te at the time of the CNG operation, and the graph "Gliq2" indicates the relationship between the torque fluctuation Tc and the engine torque Te at the time of the liquid fuel operation. Hereinafter, as one example, the case of switching the fuel from the CNG fuel to the liquid fuel will be explained. The corresponding point "PAtag" is a target corresponding point after switching the fuel in case of switching the fuel at the time when the state of the internal combustion engine 100 exists at the corresponding point "PA". The corresponding point "PBtag" is a target corresponding point after switching the fuel in case of switching the fuel at the time when the state of the internal combustion engine 100 exists at the corresponding point "PB".

As shown in FIG. 3, in either case of the CNG operation and the liquid fuel operation, the higher the engine torque Te is, the smaller the torque fluctuation Tc becomes. In other words, as the engine torque Te is high, the combustion in the internal combustion engine 100 becomes stable and the torque fluctuation Tc is reduced. As shown in the graph Gcng2 and the graph Gliq2, the smaller the engine torque Te is, the larger the variation ratio of the torque fluctuation Tc to the engine torque Te becomes. The smaller the torque fluctuation Tc is, the larger the variation ratio of the engine torque Te to the torque fluctuation Te becomes.

In consideration of the above-mentioned fact, at the time of switching the fuel from the CNG fuel to the liquid fuel, the ECU 50 determines that the variation of the engine torque Te associated with the torque fluctuation keeping control is much smaller than the variation of the torque fluctuation Tc associated with the torque keeping control in case of the corresponding point PA where the engine torque Te is relatively low. Therefore, in this case, the ECU 50 determines that the influence on the drivability caused by the torque fluctuation keeping control is smaller.

The concrete explanation thereof will be described below. When the ECU 50 executes the torque fluctuation keeping control at the corresponding point PA, the ECU 50 transfers the state of the internal combustion engine 100 after switching the fuel to the corresponding point "PA1" where the torque fluctuation Tc generated before switching the fuel and the torque fluctuation Tc generated after switching the fuel are equivalent. Thereafter, the ECU 50 gradually transfers the state of the internal combustion engine 100 from the corresponding point PA1 to the target corresponding point PAtag. In this case, the torque fluctuation Tc is unchanged before and after switching the fuel, and the variation of the engine torque Te is relatively small. Therefore, when the state is transferred from the corresponding point PA to the corresponding point PA1 by the torque fluctuation keeping control, it is estimated that the influence on the drivability is small.

In contrast, when the ECU 50 executes the torque keeping control at the corresponding point PA, the ECU 50 transfers the state of the internal combustion engine 100 after switching the fuel to the corresponding point PA2 where the engine torque Te generated before switching the fuel and the engine torque Te generated after switching the fuel are equivalent. Thereafter, the ECU 50 gradually transfers the state of the internal combustion engine 100 from the corresponding point PA2 to the target corresponding point PAtag. In this case, the torque fluctuation Tc considerably increases at the time when the state of the internal combustion engine 100 transfers from the corresponding point PA to the corresponding point PA2. Therefore, when the state from the corresponding point PA is transferred to the corresponding point PA2 by executing the torque keeping control, there is a possibility of deteriorating the drivability.

Therefore, when the state of the internal combustion engine 100 exists at the corresponding point PA at the time of fuel switch from the CNG fuel to the liquid fuel, the ECU 50 determines that the influence on the drivability caused by executing the torque fluctuation keeping control is smaller than the influence on the drivability caused by executing the torque keeping control.

Next, a description will be given of a case where the engine torque Te exists at the corresponding point PB where the engine torque Te is relatively large at the time of switching the fuel from the CNG fuel to the liquid fuel. In this case, the ECU 50 determines that the variation of the torque fluctuation Tc associated with the torque keeping control is much smaller than the variation of the engine torque Te associated with the torque fluctuation keeping control. Therefore, in this case, the ECU 50 determines that the influence on the drivability caused by executing the torque keeping control is smaller.

The concrete explanation thereof will be described below. When the ECU 50 executes the torque fluctuation keeping control at the corresponding point PB, after switching the fuel, the ECU 50 transfers the state of the internal combustion engine 100 to the corresponding point "PB1" where the torque fluctuation Tc generated before switching the fuel and the torque fluctuation Tc generated after switching the fuel are equivalent. Thereafter, the ECU 50 gradually transfers the state of the internal combustion engine 100 from the corresponding point PB1 to the target corresponding point PBtag. In this case, the variation of the engine torque Te generated at the time when the state of the internal combustion engine 100 is transferred from the corresponding point PB to the corresponding point PB1 is relatively large.

In contrast, when the ECU 50 executes the torque keeping control at the corresponding point PB, the ECU 50 transfers the state of the internal combustion engine 100 after switching the fuel to the corresponding point "PB2" where the engine torque Te generated before switching the fuel and the engine torque Te generated after switching the fuel are equivalent. Thereafter, the ECU 50 gradually transfers the state of the internal combustion engine 100 from the corresponding point PB2 to the target corresponding point PBtag. In this case, the variation of the torque fluctuation Tc generated at the time when the state of the internal combustion engine 100 is transferred from the corresponding point PB to the corresponding point PB2 is small, and the engine torque Te does not also vary. Therefore, in this case, the ECU 50 determines that the influence on the drivability caused by executing the torque keeping control is small.

Therefore, when the state of the internal combustion engine 100 exists at the corresponding point PB at the time of switching the fuel from the CNG fuel to the liquid fuel, the ECU 50 determines that the influence on the drivability caused by executing the torque fluctuation keeping control is larger than the influence on the drivability caused by executing the torque keeping control.

As described above, the ECU 50 executes the control which has a smaller influence on the drivability out of the torque fluctuation keeping control and the torque keeping control. Concretely, based on the state of the internal combustion engine 100 at the time of switching the fuel such as the torque fluctuation Tc, the engine torque Te and the air fuel ratio AF, the ECU 50 determines which one of the torque fluctuation keeping control and the torque keeping control has a smaller influence on the drivability with reference to a predetermined map, for example. The above-mentioned map is a map indicating which one of the torque fluctuation keeping control and the torque keeping control has a smaller influence on the drivability with respect to each state of the internal combustion engine 100 at the time of switching the fuel. For example, the above-mentioned map is prepared in advance by experimental trials with respect to each state of the internal combustion engine 100 at the time of switching the fuel, and it is stored in the memory of the ECU 50. By setting the proper execution conditions of the torque fluctuation keeping control as described above, the ECU 50 can certainly suppress the deterioration of the drivability at the time of switching the fuel. The ECU 50 can also suppress the deterioration of the emission due to the deterioration of the drivability.

[Process Flow]

Figure 4:
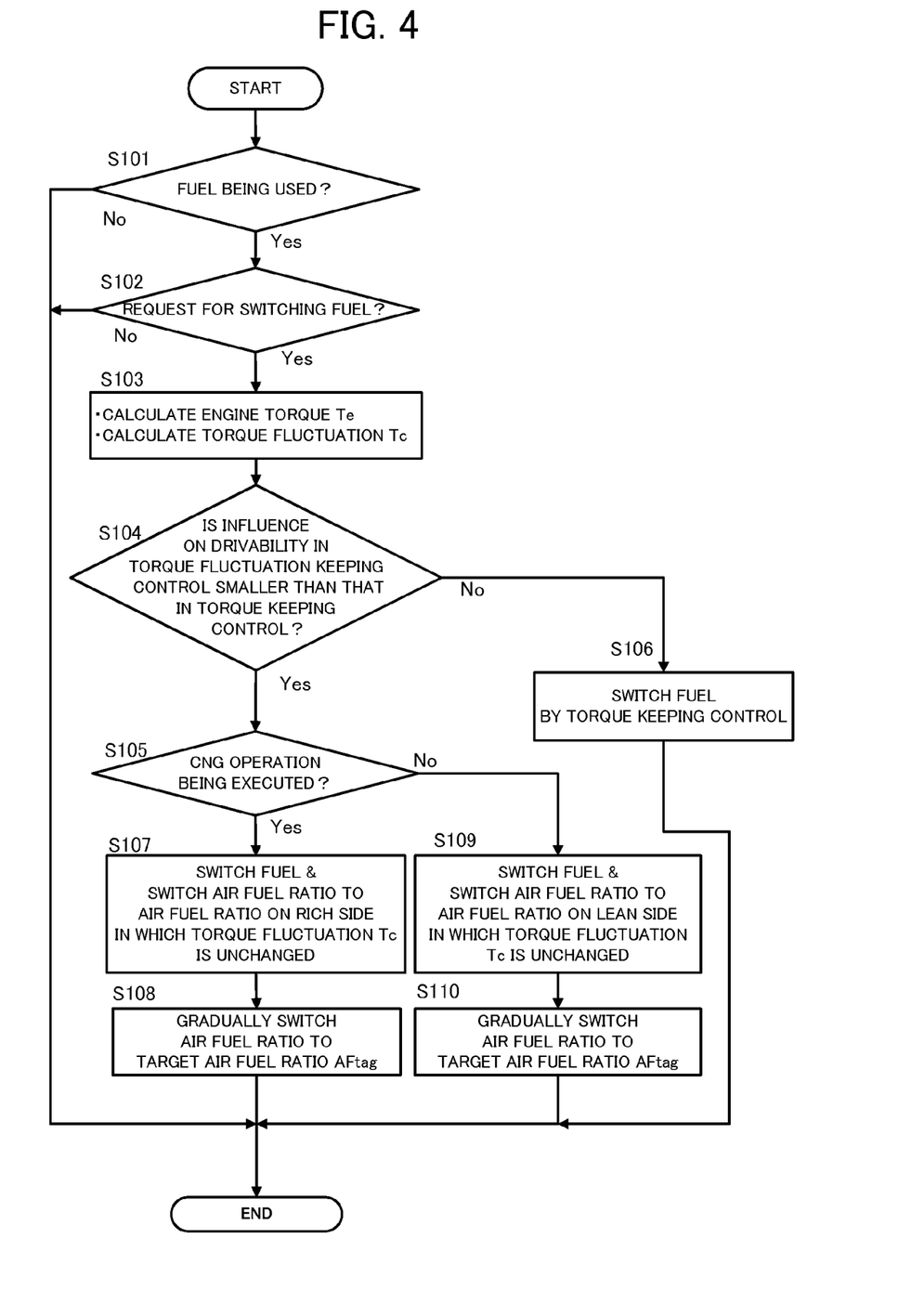
FIG. 4 is an example of a flowchart showing a procedure of the process according to the embodiment.

Next, a description will be given of a procedure of the process executed by the ECU 50. FIG. 4 shows an example of a flow chart showing the procedure in case of executing the process according to the embodiment. The flowchart shown in FIG. 4 is repeatedly executed by the ECU 50 in a predetermined cycle.

First, the ECU 50 determines whether or not the fuel is being used (step S101). When the ECU 50 determines that the fuel is being used (step S101; Yes), the ECU 50 proceeds with the process at step S102. In contrast, when the ECU 50 determines that the fuel is not being used (step S101; No), the ECU 50 terminates the process of the flowchart.

Next, the ECU 50 determines whether or not switching the fuel is requested (step S102). Concretely, based on the operation state of the vehicle, the ECU 50 determines whether or not the ECU 50 should switch the operation from the CNG operation to the liquid fuel operation or from the liquid fuel operation to the CNG operation. When the ECU 50 determines that it should switch the fuel (step S102; Yes), the ECU 50 proceeds with the process at step S103. In contrast, when the ECU 50 determines that it should not switch the fuel (step S102; No), the ECU 50 terminates the process of the flowchart.

When the ECU 50 determines that the ECU 50 should switch the fuel, the ECU 50 calculates the engine torque Te and the torque fluctuation Tc (step S103). For example, the ECU 50 detects the engine speed and intake air amount from various sensors thereby to calculate the present engine torque Te based on the detection values with reference to a predetermined map or an equation. For example, the ECU 50 sets the torque fluctuation Tc by calculating the difference between the engine torque Te calculated at a predetermined time and the engine torque Te calculated at a time passing a predetermined time length since the predetermined time.

Next, the ECU 50 determines whether or not the influence on the drivability caused by executing the torque fluctuation keeping control is smaller than the influence on the drivability caused by executing the torque keeping control in terms of the drivability (step S104). For example, based on the engine torque Te and the torque fluctuation Tc which are calculated at step S103, the ECU 50 makes the above-mentioned determination with reference to a predetermined map. When the ECU 50 determines that the influence on the drivability caused by executing the torque fluctuation keeping control is smaller than the influence on the drivability caused by executing the torque keeping control (step S104; Yes), the ECU 50 executes the torque fluctuation keeping control at the time of switching the fuel. Concretely, the ECU 50 executes the following processes at step S105 and step S107 to step S110.

In contrast, when the ECU 50 determines that the influence on the drivability caused by executing the torque fluctuation keeping control is not smaller than the influence on the drivability caused by executing the torque keeping control (step S104; No), i.e., when the ECU 50 determines that the influence caused by executing the torque keeping control is smaller than the influence caused by executing the torque fluctuation keeping control in terms of the drivability, the ECU 50 switches the fuel by the torque keeping control (step S106). Namely, in this case, the ECU 50 keeps the engine torque Te unchanged before and after switching the fuel, and it also controls the air fuel ratio AF so that the engine torque Te becomes a predetermined target value after switching the fuel.

Next, the process at step S105 and the following processes will be described below. The ECU 50 determines whether or not the CNG operation is being executed (step S105). When the ECU 50 determines that the CNG operation is being executed (step S105; Yes), the ECU 50 switches the fuel and it also switches the air fuel ratio AF to the air fuel ratio AF on the rich side with which the torque fluctuation Tc before switching the fuel and the torque fluctuation Tc after switching the fuel are equivalent (step S107). Namely, in this case, the ECU 50 switches the CNG operation to the liquid fuel operation and it switches the air fuel ratio AF to the air fuel ratio AF on the rich side selected from the air fuel ratios AF with which the torque fluctuation Tc is unchanged before and after switching the fuel. Thereby, the ECU 50 keeps the torque fluctuation Tc unchanged before and after switching the operation from the CNG operation to the liquid fuel operation thereby to suppress the deterioration of the drivability. By switching the air fuel ratio AF to the air fuel ratio AF on the rich side, the ECU 50 can suppress the deterioration of the torque fluctuation Tc due to the deviation between the command value of the air fuel ratio AF and the real value. Thereafter, the ECU 50 gradually switches the air fuel ratio AF to the target air fuel ratio AFtag (step S108).

In contrast, when the ECU 50 determines that the CNG operation is not being executed (step S105; No), i.e., when the ECU 50 determines that the liquid fuel operation is being executed, the ECU 50 switches the fuel and switches the air fuel ratio AF to the air fuel ratio AF on the lean side with which the torque fluctuation Tc before switching the fuel and the torque fluctuation Tc after switching the fuel are equivalent (step S109). Namely, in this case, the ECU 50 switches the liquid fuel operation to the CNG operation, and it also switches the present air fuel ratio AF to the air fuel ratio AF on the lean side selected from the air fuel ratios AF in which the torque fluctuation Tc is unchanged before and after switching the fuel. Thereby, the ECU keeps the torque fluctuation Tc unchanged before and after switching the liquid fuel operation to the CNG operation thereby to suppress the deterioration of the drivability. By switching the present air fuel ratio AF to the air fuel ratio AF on the lean side, the ECU 50 can suppress the deterioration of the torque fluctuation Tc due to the deviation between the command value of the air fuel ratio AF and the real value. Thereafter, the ECU 50 gradually switches the air fuel ratio AF to the target air fuel ratio AFtag (step S110).

BRIEF DESCRIPTION OF THE REFERENCE NUMBER

1x First fuel injection valve
1y Second fuel injection valve
2 Intake valve
3 Sparking plug
4 Exhaust valve
7 Cylinder
9 Piston
10 Connecting rod
11 Intake passage
12 Throttle valve
13 Surge tank
15 A/F sensor 21 Regulator
50 ECU
100 Internal combustion engine

The invention claimed is:

1. A control device for an internal combustion engine, comprising:
   an engine which is driven by switching between CNG fuel and liquid fuel; and
   a control unit configured, in case of switching fuel to be supplied to the engine between the CNG fuel and the liquid fuel, to set an air fuel ratio just after switching the fuel to an air fuel ratio having torque fluctuation of the engine before switching the fuel equivalent to torque fluctuation of the engine after switching the fuel.

2. The control device for an internal combustion engine according to claim 1,
   wherein, in case of switching the fuel from the CNG fuel to the liquid fuel, the control unit switches the air fuel ratio to an air fuel ratio existing on a rich side selected from air fuel ratios with which the torque fluctuation is unchanged, and makes the air fuel ratio gradually approximate a target air fuel ratio after switching the air fuel ratio.

3. The control device for an internal combustion engine according to claim 1,
   wherein, in case of switching the fuel from the liquid fuel to the CNG fuel, the control unit switches the air fuel ratio to an air fuel ratio existing on a lean side selected from air fuel ratios with which the torque fluctuation is unchanged, and makes the air fuel ratio gradually approximate a target air fuel ratio after switching the air fuel ratio.

4. The control device for an internal combustion engine according to claim 1,
   wherein the control unit switches the air fuel ratio so that the torque fluctuation of the engine is unchanged before and after switching the fuel, in a case where an influence caused by switching the air fuel ratio so that the torque fluctuation is unchanged is considered to be smaller than an influence caused by switching the air fuel ratio so that torque of the engine is unchanged before and after switching the fuel.

\* \* \* \* \*